United States Patent
Lee et al.

(10) Patent No.: US 10,199,917 B2
(45) Date of Patent: Feb. 5, 2019

(54) CURRENT MODE HYSTERETIC BUCK CONVERTER WITH AUTO-SELECTABLE FREQUENCY LOCKING CIRCUIT

(71) Applicant: Korea Advanced Institute of Science and Technology, Daejeon (KR)

(72) Inventors: Sang-Gug Lee, Daejeon (KR); Jeong-Il Seo, Daejeon (KR); Baek-Min Lim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 7 days.

(21) Appl. No.: 15/690,670

(22) Filed: Aug. 30, 2017

(65) Prior Publication Data
US 2018/0123440 A1   May 3, 2018

(30) Foreign Application Priority Data

Oct. 31, 2016   (KR) ........................ 10-2016-0142978

(51) Int. Cl.
*H02M 1/08* (2006.01)
*H02M 1/14* (2006.01)
(Continued)

(52) U.S. Cl.
CPC .............. *H02M 1/08* (2013.01); *H02M 1/14* (2013.01); *H02M 3/156* (2013.01);
(Continued)

(58) Field of Classification Search
CPC .......... H02M 1/08; H02M 1/14; H02M 3/156; H02M 3/157; H02M 3/158; H03L 7/085
(Continued)

(56) References Cited

U.S. PATENT DOCUMENTS

| | | | | |
|---|---|---|---|---|
| 4,009,448 A | * | 2/1977 | Hopwood | ................ H03L 7/12 331/12 |
| 6,348,780 B1 | * | 2/2002 | Grant | .................... H02M 3/156 323/222 |

(Continued)

OTHER PUBLICATIONS

Moon et al.; "An automatic load-adaptive switching frequency selection technique for improving the light-load efficiency of a buck converter", Springer Science and Business Media, New York; Mar. 7, 2013; pp. 349-358 (10 pages).

*Primary Examiner* — Yemane Mehari
(74) *Attorney, Agent, or Firm* — Harness, Dickey & Pierce, P.L.C.

(57) ABSTRACT

A current mode hysteretic buck converter employing an auto-selectable frequency locking circuit is disclosed. The auto-selectable frequency locking type buck converter include a current mode hysteretic buck converter for converting an input DC voltage into a lower DC voltage, and a frequency locking unit for locking a switching frequency of the current mode hysteretic buck converter wherein the switching frequency is locked through adjusting a locking value of the switching frequency to be a predetermined value according to a size of a load. The buck converter is, based on the current mode hysteretic control, related to a circuit that locks the switching frequency of the converter to reduce the difficulty of designing electromagnetic interference (EMI) filters in the converter. In addition, the buck converter can improve the efficiency at light load by adjusting the switching frequency which is locked according to the load current.

19 Claims, 4 Drawing Sheets

(51) Int. Cl.
*H02M 3/156* (2006.01)
*H02M 1/00* (2006.01)

(52) U.S. Cl.
CPC .. *H02M 3/1563* (2013.01); *H02M 2001/0032* (2013.01); *H02M 2001/0054* (2013.01)

(58) Field of Classification Search
USPC ........ 323/222, 223, 234, 271, 282–286, 312
See application file for complete search history.

(56) References Cited

U.S. PATENT DOCUMENTS

| | | | |
|---|---|---|---|
| 9,762,132 B2* | 9/2017 | Freeman | H02M 3/33546 |
| 2006/0033483 A1* | 2/2006 | Wu | H02M 3/156 323/282 |
| 2014/0217996 A1* | 8/2014 | Peker | H02M 3/1582 323/271 |
| 2016/0118906 A1* | 4/2016 | Freeman | H02M 3/33546 363/21.05 |

* cited by examiner

CURRENT MODE HYSTERETIC BUCK CONVERTER WITH AUTO-SELECTABLE FREQUENCY LOCKING CIRCUIT

CROSS-REFERENCE TO RELATED APPLICATION

This U.S. non-provisional application claims priority under 35 USC § 119 from Korean Patent Application No. 10-2016-0142978, filed on Oct. 31, 2016 in the Korean Intellectual Property Office (KIPO), the disclosure of which is hereby incorporated by reference in its entirety.

BACKGROUND

1. Technical Field

Some embodiments of the present inventive concepts are directed to a converter device for converting an input direct current (DC) voltage into a DC voltage of a different level and outputting the same, and more particularly to a buck converter for processing the input DC voltage into an output voltage lower than the input voltage.

2. Description of the Related Art

A DC-DC converter is a device that outputs a regulated voltage of low ripple by processing an arbitrary input voltage into the voltage required by a load, and is often used to provide a supply voltage to an electronic device. The DC to DC power converters may be classified into two types according to a driving method: one is a linear type converter that directly converts the voltage and the other is a switching type that converts the voltage by controlling a width of a pulse to be transmitted to an output. Of these, the switching type converter is widely used for its high converting efficiency.

The switching type converters are classified into buck, boost, and buck/boost converter depending on the relationship between input voltage and output voltage. The buck converter steps down voltage from its input to its output (load) while stepping up current. The buck converter requires fast transient response characteristic and high energy efficiency over a wide load range. Its control mode may be roughly divided into a voltage mode control, a current mode control, a voltage mode hysteretic control, and current mode hysteretic control according to the method of generating a switching signal, that is, a pulse width modulation (PWM) signal. A buck converter architecture that adjusts the PWM signal by comparing inductor current ripple and hysteresis is called a current mode hysteretic buck converter. The hysteretic buck converter is one of the control schemes of a popular buck converter with simple structure and unconditionally stable stability.

The buck converter may be inefficient due to the switching loss that occurs during the ON/OFF operation of the power switch at light load. The buck converter using the current mode hysteretic control is not constant in switching frequency due to its operating characteristics. The switching frequency may be changed by various factors. In other words, since the circuit has a pulse frequency modulation (PFM) module whose frequency is controlled according to the load, there is no need for a separate circuit for increasing the efficiency at the light load. However, the variable switching frequency may cause difficulties in designing the converter's electromagnetic interference (EMI) filter.

SUMMARY

The present invention has been made under the recognition of the above-mentioned problems of the conventional art. Some embodiments of the present inventive concepts provide a current mode hysteretic buck converter having an automatic select frequency locking function that can lock the varying switching frequency of the current mode hysteretic buck converter, and achieve high efficiency in light load by adjusting the magnitude of the frequency locking value according to the load in order to compensate for the inherent PFM characteristics which may be lost by making the switching frequency be constant.

In one aspect, the present inventive concepts are directed to an auto-selectable frequency locking buck converter that includes a current mode hysteretic buck converter for converting an input DC voltage into a lower DC voltage, and a frequency locking unit for locking a switching frequency of the current mode hysteretic buck converter wherein the switching frequency is locked through adjusting a locking value of the switching frequency to be a predetermined value according to a size of a load.

According to an exemplary embodiment, the frequency locking unit may divide the size of the load into a plurality of sections, and automatically adjust a variable switching frequency of the current mode hysteretic buck converter to be locked so that switching frequencies of different sizes are matched for each section of the size of the load.

According to an exemplary embodiment, the frequency locking unit may adjust a value of the switching frequency by adjusting a slope of a ripple signal obtained from the current mode hysteretic buck converter through comparing a real-time switching frequency of the current mode hysteretic buck converter with a reference frequency of a predetermined size.

According to an exemplary embodiment, the frequency locking unit may adjust the slope of the ripple signal by adjusting a resistance value of a resistor-capacitor network (hereinafter, referred to as 'RC network') connected in parallel to an inductor.

According to an exemplary embodiment, the frequency locking unit may automatically adjust the resistance value of the RC network when there is a change in an input voltage and a load current by changing hysteresis $V_H$ and $V_L$ of a hysteretic comparator set in advance according to a load condition.

According to an exemplary embodiment, the resistor of the RC network may include a switched resistor of which resistance value is able to be changed by a digital input signal.

According to an exemplary embodiment, the current mode hysteretic buck converter may be a circuit structure that converts a magnitude of an input voltage by switching the load to which first and second switch elements are connected, and further include a discontinuous conduction mode (DCM) circuit for preventing a reverse current flow by turning off the second switch element in an ON state when a reverse current flows to the second switch element from the load due to a low load current.

According to an exemplary embodiment, the frequency locking unit may include: a load comparator for generating a digital control signal of a predetermined bit according to a magnitude of a load current within a predetermined load current range; a variable clock signal provider capable of generating a plurality of types of clock signals having different frequencies and outputting a clock signal of a specific frequency among the clock signals based on the digital control signal output from the load comparator; and a digital frequency locking unit for tuning a resistance of a variable load resistor of the current mode hysteretic buck converter based on a result of comparison between the clock signal of the specific frequency provided by the variable clock signal provider and a PWM signal generated for switching control of the load by the current mode hysteretic buck converter.

According to an exemplary embodiment, the load comparator may include: a load current sensor for sensing a magnitude of a load current applied to a parallel circuit of an inductor and a resistor-capacitor network through first and second switch elements of the current mode hysteretic buck converter; and a load comparator for comparing a magnitude of the load current with at least one threshold value and outputting a comparison result as the digital control signal.

According to an exemplary embodiment, the frequency locking unit further includes a hysteresis control unit for maintaining a range of resistance value of a load resistor required for locking frequency according to a reference value by adjusting hysteresis of the digital control signal which is received from the load comparator.

According to an exemplary embodiment of the present invention, the variable clock signal provider may include a clock signal generator for generating a clock signal of a predetermined frequency, a frequency divider for dividing a frequency of the clock signal generated by the clock signal generator into a plurality of types of clock signals having different frequencies, and a switching unit for selectively outputting any one of the plurality of types of clock signals generated by the frequency divider based on a frequency selection control signal.

According to an exemplary embodiment, the digital frequency locking unit may include: a first up/down counter for up-counting or down-counting an incoming clock signal according to an up/down signal; a phase frequency detector for comparing a frequency of a PWM signal provided by a hysteresis comparator with a frequency of a reference signal provided by a frequency divider to generate an up-pulse or a down-pulse according to difference therebetween; an up/down selector for receiving the up-pulse and the down-pulse from the phase frequency detector and generating the up/down signal for determining an up/down operation of the first up/down counter; an OR circuit for outputting a clock signal $CLK_P$ obtained by performing an OR operation on the up-pulse and the down-pulse outputted from the phase frequency detector; a switching unit for selectively outputting either one of the clock signal $CLK_P$ from the OR circuit and an externally provided clock signal CLK based on a switching control signal; a second up/down counter for outputting a switching control signal to the switching unit such that the switching unit selects and outputs the externally provided clock signal CLK instead of the clock signal $CLK_P$ when a cumulative count value of an incoming clock signal reaches a predetermined value; and a reset generator for generating a low signal that lasts for a predetermined time to reset the second up/down counter whenever a value of the least significant bit of a control signal generated by the load comparator is changed.

According to an exemplary embodiment, the current mode hysteretic buck converter may include: a load circuit including an inductor and an RC network, including a resistor and a capacitor, being coupled in parallel to the inductor, for generating a ripple signal; a switching unit, including first and second switch elements connected to the load circuit, for switching such that a magnitude of a voltage applied to the load circuit is varied by switching a magnitude of an input voltage and adjusting a frequency of the ripple signal; a hysteresis comparator for receiving the ripple signal, comparing the ripple signal with an upper threshold value and a lower threshold value of a hysteresis voltage, and outputting a PWM signal according to a comparison result; and a gate driver for receiving the PWM signal and controlling on/off of the first and second switch elements of the switching unit. According to an exemplary embodiment, the resistor may be a switched resistor of which resistance value can be changed by a digital input signal provided by the frequency locking unit.

In another aspect, the present inventive concepts are directed to an auto-selectable frequency locking type buck converter that includes a current mode hysteretic buck converter, a frequency locking unit, and a discontinuous conduction mode (DCM) circuit. The current mode hysteretic buck converter converts an input DC voltage into a lower DC voltage by switching a load to which first and second switch elements are connected. The frequency locking unit locks a switching frequency of the current mode hysteretic buck converter wherein the switching frequency is locked through adjusting a locking value of the switching frequency to be a predetermined value according to a size of a load. The discontinuous conduction mode (DCM) circuit prevents a reverse current flow by turning off the second switch element in an ON state when a reverse current flows to the second switch element from the load due to a low load current. The frequency locking unit divides the size of the load into a plurality of sections, and automatically adjusts the switching frequency of the current mode hysteretic buck converter which is variable to be locked so that switching frequencies of different sizes are matched for each section of the size of the load.

According to an exemplary embodiment, the frequency locking unit may adjust a value of the switching frequency by adjusting a slope of a ripple signal obtained from the current mode hysteretic buck converter through comparing a real-time switching frequency of the current mode hysteretic buck converter with a reference frequency of a predetermined size.

According to an exemplary embodiment, the frequency locking unit may adjust the slope of the ripple signal by adjusting a resistance value of a resistor-capacitor network, including a resistor and a capacitor connected, in parallel to an inductor.

According to an exemplary embodiment, the frequency locking unit automatically may adjust the resistance value of the resistor-capacitor network when there is any change in an input voltage and a load current by changing hysteresis $V_H$ and $V_L$ of a hysteretic comparator set in advance according to a condition of the load.

According to an exemplary embodiment, the frequency locking unit may include a load comparator for generating a digital control signal of a predetermined bit according to a magnitude of a load current within a predetermined load current range, a variable clock signal provider capable of generating a plurality of types of clock signals having different frequencies and outputting a clock signal of a specific frequency among the clock signals based on the digital control signal output from the load comparator, a digital frequency locking unit for tuning a resistance of a variable load resistor of the current mode hysteretic buck converter based on a result of comparison between the clock signal of the specific frequency provided by the variable clock signal provider and a PWM signal generated for switching control of the load by the current mode hysteretic buck converter, and a hysteresis control unit for maintaining a range of resistance value of a load resistor required for locking frequency according to a reference value by adjusting hysteresis of the digital control signal which is received from the load comparator.

According to an exemplary embodiment, the digital frequency locking unit may include a first up/down counter for up-counting or down-counting an incoming clock signal according to an up/down signal; a phase frequency detector for comparing a frequency of a PWM signal provided by a hysteresis comparator with a frequency of a reference signal provided by a frequency divider to generate an up-pulse or a down-pulse according to difference therebetween; an up/down selector for receiving the up-pulse and the down-pulse from the phase frequency detector and generating the up/down signal for determining an up/down operation of the first up/down counter; an OR circuit for outputting a clock signal $CLK_P$ obtained by performing an OR operation on the up-pulse and the down-pulse outputted from the phase frequency detector; a switching unit for selectively outputting either one of the clock signal $CLK_P$ from the OR circuit and an externally provided clock signal CLK based on a switching control signal; a second up/down counter for outputting a switching control signal to the switching unit such that the switching unit selects and outputs the externally provided clock signal CLK instead of the clock signal $CLK_P$ when a cumulative count value of an incoming clock signal reaches a predetermined value; and a reset generator for generating a low signal that lasts for a predetermined time to reset the second up/down counter whenever a value of the least significant bit of a control signal generated by the load comparator is changed.

The auto-select frequency locking circuit for the current mode hysteretic buck converter according to the embodiments of the present invention having the above-described configuration locks the switching frequency of the hysteretic control but can achieve high efficiency by adjusting the size of the locked switching frequency depending on the load to compensate for the inherent PFM characteristics lost by taking a constant switching frequency, The auto-select frequency locking circuit may introduces a circuit for adjusting and locking the switching frequency according to a load in parallel with a basic current mode hysteretic buck converter. The basic operation principle of this frequency locking circuit is to control the switching frequency by adjusting the resistance value in the RC network connected in parallel to the inductor that is, by controlling the slope of the ripple signal $V_{FB}$ through comparing the reference frequency with the current switching frequency. In addition, the hysteresis $V_H$ and $V_L$ of the hysteretic comparator set in advance may be changed according to the load condition. Therefore, when there is any change in the input voltage and the load current, the frequency locking circuit can lock the variable switching frequency by initiating its operation and automatically adjusting a resistance value of the RC network.

The addition of the frequency locking circuit block according to the present invention to a current mode hysteretic buck converter can solve the inconsistent switching frequency problem of the conventional converters and improve power efficiency at light loads.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
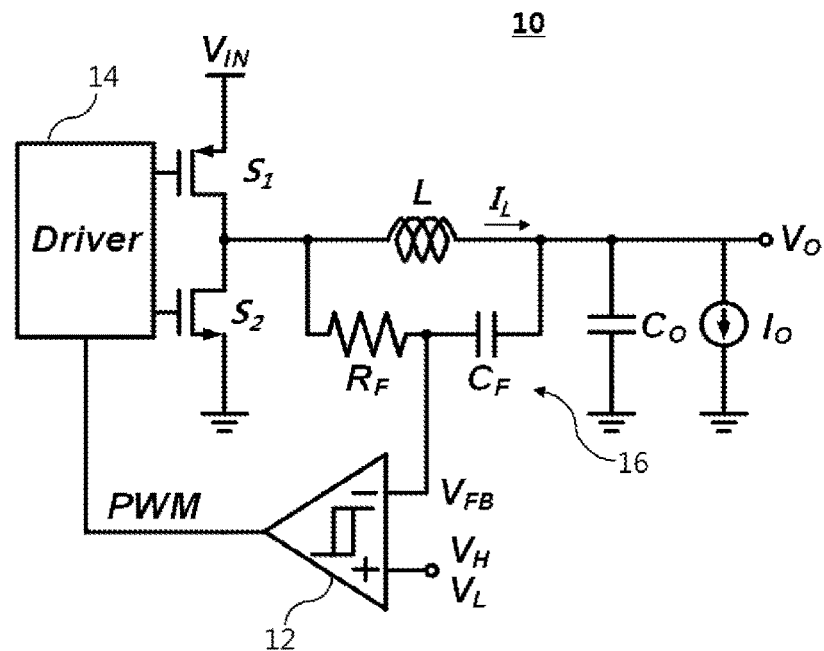
FIG. 1 illustrates an exemplary basic circuit configuration of a current mode hysteretic buck converter as a basis of the present invention.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 shows an example of a basic circuit configuration of a current mode hysteretic buck converter 10 as a basis of the present invention. According to an exemplary embodiment, an RC network 16 including a resistor $R_F$ and a capacitor $C_F$ may be connected in parallel with an inductor L. The connection point of the resistor $R_F$ and the capacitor $C_F$ of the RC network 16 may be connected to an input terminal of a hysteresis comparator 12. The output of the hysteresis comparator 12 may be connected to an input terminal of a gate driver 14. Gates of first and second switch elements $S_1$ and $S_2$ may be connected to two output terminals of the gate driver 14, respectively. For example, a p-channel MOSFET and an n-channel MOSFET may be used as the first and second switch elements $S_1$ and $S_2$, respectively. In an exemplary example, sources of the first and second switch elements $S_1$ and $S_2$ may be connected to the input voltage $V_{IN}$ and the ground, respectively, while the drain terminals thereof are connected to each other. And one end (i.e., the resistor $R_F$ side) of the RC network 16 and the inductor L may be connected to the drain terminals of the first and second switch elements $S_1$ and $S_2$. An output voltage $V_O$ may be obtained from the other end of the RC network 16 and the inductor L, and a capacitor $C_O$ and a current source $I_O$ may be also connected to the other end of the RC network 16 and the inductor L.

Figure 2:
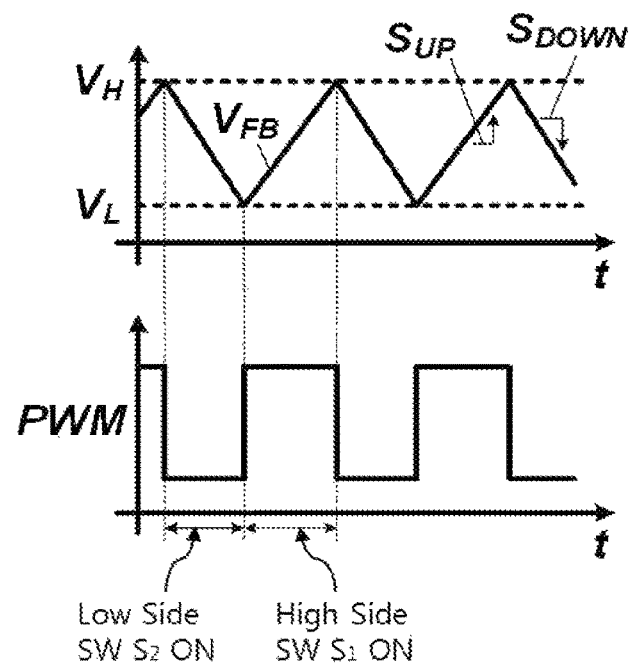
FIG. 2 illustrates an operation waveform diagram of the circuit shown in FIG. 1.

FIG. 2 illustrates an operation waveform diagram of the circuit shown in FIG. 1. The operation of the converter 10 will be described below with reference to the waveform diagram illustrated in FIG. 2 as well as FIG. 1.

With reference to FIGS. 1 and 2, the ripple signal $V_{FB}$ is generated by the RC network 16 connected in parallel to the inductor L. At this time, the time constant of the RC network 16 may be sufficiently larger than a switching period. The ripple signal $V_{FB}$ may be input to the hysteresis comparator 12. The hysteresis comparator 12 compares the input ripple signal $V_{FB}$ with an upper threshold $V_H$ and a lower threshold $V_L$ to output a PWM signal based on the comparison. The PWM signal generated by the hysteresis comparator 12 may be fed to the gate driver 14. The output of the gate driver 14 may be used to control ON/OFF switching of the first and second switch elements $S_1$ and $S_2$. The driver 14 controls the first and second switch elements $S_1$ and $S_2$ such that they are alternatingly switched. That is, when the first switch element $S_1$ is ON, the second switch element $S_2$ may be kept OFF, and when the second switch element $S_2$ is ON, the first switch element $S_1$ may be kept OFF. When the first switch element $S_1$ is turned on (in this case, the second switch element $S_2$ is OFF), the current $I_L$ flowing through the inductor L may rise and the ripple signal $V_{FB}$ by the RC network 16 may also increase.

The slope $S_{UP}$ of the ripple signal $V_{FB}$ at that time may be expressed by the following equation.

$$S_{UP} = \frac{V_{IN} - V_O}{R_F C_F} \quad (1)$$

Here, $V_{IN}$ is an input voltage of the buck converter 10, $V_O$ is an output voltage of the buck converter 10. $R_F$ and $C_F$ represent the resistance and capacitance of the resistor and capacitor, respectively, forming the RC network 16.

The ON time $T_{ON}$ at which the first switch element $S_1$ is turned on may be expressed as follows.

$$T_{ON} = \frac{R_F C_F (V_H - V_L)}{V_{IN} - V_O} \quad (2)$$

When the second switch element $S_2$ is turned on (in this case, the first switch element $S_1$ is kept OFF), the ripple signal $V_{FB}$ from the inductor current $I_L$ and from the RC network 16 is reduced. At this time, the slope $S_{DOWN}$ of the ripple signal $V_{FB}$ is as follows.

$$S_{DOWN} = -\frac{V_O}{R_F C_F} \quad (3)$$

The OFF time $T_{OFF}$ during which the second switch element $S_2$ is turned on may be determined as follows.

$$T_{OFF} = \frac{R_F C_F (V_H - V_L)}{V_O} \quad (4)$$

The switching frequency $f_S$ of the buck converter 10 can be obtained using the on-time $T_{ON}$ and the off-time $T_{OFF}$ and expressed as follows.

$$f_S = \frac{(V_{IN} - V_O) V_O}{R_F C_F (V_H - V_L) V_{IN}} \quad (5)$$

At this time, the switching frequency $f_S$ represents the frequency when the converter 10 operates in a continuous conduction mode (CCM). From Equation 5, it can be seen that the switching frequency $f_S$ of the converter 10 may be varied by various factors such as $R_F$, $C_F$, $V_{IN}$ and hysteresis.

The EMI of the current mode hysteretic buck converter 10 shown in FIG. 1 is mostly generated from the switching operations of the first and second switch elements $S_1$ and $S_2$ of the converter 10. Thus, the peak value of the EMI spectrum of the converter may appear as harmonics of the converter's switching frequency $f_S$. For the converters with high switching frequencies, it is required to design an EMI filter to meet the EMI standard based on the EMI regulation.

In most cases, the current mode hysteretic buck converter 10 having the basic configuration as shown in FIG. 1 has a switching frequency $f_S$ that is not constant and thus the frequency at which the EMI peak is generated may vary, so that it is difficult to design the EMI filter for the standard specification. Therefore, in order to reduce the difficulty of the EMI filter design, it is required to lock the variable switching frequency $f_S$. However, when the switching frequency is fixed to a value, the efficiency of the converter may be lowered due to the switching loss and the driving loss in the first and second switching elements $S_1$ and $S_2$, which are the power switches of the converter 10, when the load current is low. That is, locking the frequency of the switching frequency $f_S$ has an advantage of facilitating the design of the EMI filter, but also has the disadvantage of lowering the efficiency of the converter 10.

The reason why the driving loss and the switching loss occur in the power switches $S_1$ and $S_2$ when the load current is reduced with the switching frequency fixed is explained in more detail.

In the case of the ideal power switch, its resistance becomes infinite and the current cannot flow through it in the OFF state. However, in the ON state, its resistance (R) is 0 and thus there is no power loss ($P=I^2R$) by the current (I) flowing through the ideal power switch and its internal resistance. In order to reduce the switch resistance of the power switches in the ON state, that is, the first and second switch elements $S_1$ and $S_2$ used in the converter 10, the size of the power switches is designed to be large. Here, in order to turn on/off the power switches $S_1$ and $S_2$, a proper voltage must be applied to the gate terminals of the power switches $S_1$ and $S_2$.

However, when the sizes of the power switches $S_1$ and $S_2$ are large, the parasitic capacitances that are presented toward the gate terminals of the power switches $S_1$ and $S_2$ become large. Therefore, in order to apply an appropriate voltage for ON/OFF of the power switches $S_1$ and $S_2$ (for example, they are ON when VDD is applied to the gates, and OFF when 0 [V] is applied), it is necessary to charge or discharge the parasitic capacitors. At this time, the gate driving unit 14 connected to the power switches S$_1$ and S$_2$ which are the circuits for charging and discharging the parasitic capacitors sources a current to or sinks a current from the gates of the power switches S$_1$ and S$_2$. At least a certain amount of charge is required to charge and discharge the capacitors. The loss associated with the amount of charge consumed and the charge and discharge time is the driving loss, which is simply expressed as P=VI=V(Q/t)=QVf. Here, V is voltage, I is current, Q is charge amount, t is charge/discharge time, and f is frequency. In the case of an ideal switch, there is no current flowing into the switch immediately after the switch is turned off, and the current immediately flows as soon as the switch is turned on. In practice, however, when the power switches S$_1$ and S$_2$ are turned on/off, the voltage across the power switches S$_1$ and S$_2$ i.e., the voltage VDS between the drain and the source does not change as fast as a complete square wave, but slowly. That is, the on/off state is not abruptly made, but is gradually turned off in the on state or gradually turned on from the off state. At this time, since there is a current flowing in each of the power switches S$_1$ and S$_2$ and a voltage VDS across both ends of them, a loss occurs as much as P=VI. This loss is called switching loss. Since the switching loss increases as the power switches S$_1$ and S$_2$ are turned on/off more frequently, the switching loss is proportional to the switching frequency as the driving loss. There occurs a conduction loss (P=I$^2$R) in each of the power switches S$_1$ and S$_2$ caused by the current flowing and the internal resistance of the power switches S$_1$ and S$_2$ when the power switches S$_1$ and S$_2$ are fully on. The driving loss and the switching loss are simply the losses that occur when the power switches S$_1$ and S$_2$ are turned on and off. The conduction loss is the loss caused by the fact that the power switches S$_1$ and S$_2$ are not the ideal device, during the power switches S$_1$ and S$_2$ are on so that the current can flow.

In the buck converter 10, the current flowing when the power switches S$_1$ and S$_2$ are turned on is proportional to a load current. When the load current I$_O$ is large over a predetermined value, the conduction loss contributes more to the total loss of the buck converter 10 than the switching loss and the drive loss. The efficiency E of the buck converter 10 is the ratio between the input power P$_I$ and the output power P$_O$, which can be expressed by the following equation.

$$E=P_O/P_I=(V_O \cdot I_O)/(V_{IN} \cdot \text{current flowing to } V_{IN})=(V_O \cdot I_O)/(V_O \cdot I_O + \text{loss}) \quad (6)$$

According to equation (6), when the load current I$_O$ is large, the size of the 'loss' is smaller than the size of 'V$_O$×I$_O$', and thus the efficiency is high. On the other hand, when the load current I$_O$ is small, the conduction loss is reduced (because the load current is reduced), but the switching loss and the driving loss occur because the on/off operation of the power switches S$_1$ and S$_2$ is continued. Therefore, when the load current I$_O$ is small, since 'V$_O$×I$_O$' is relatively small but there is a loss, the efficiency is lowered because the 'loss' affects the efficiency more than when the load current I$_O$ is large. For this reason, when the load current I$_O$ is small, it is necessary to reduce the switching loss and the drive loss to increase the efficiency. Therefore, the efficiency can be improved by changing the switching frequency so that the switching loss and the driving loss are reduced.

As a solution to solve these two conflicting requirements, the present invention proposes a method of locking the switching frequency of the buck converter as well as appropriately adjusting the switching frequency value which is locked based on the size of the load, that is, the load current. By doing so, it is possible to improve the difficulty of the EMI filter design and the efficiency problem in the light load all at once.

Figure 3:
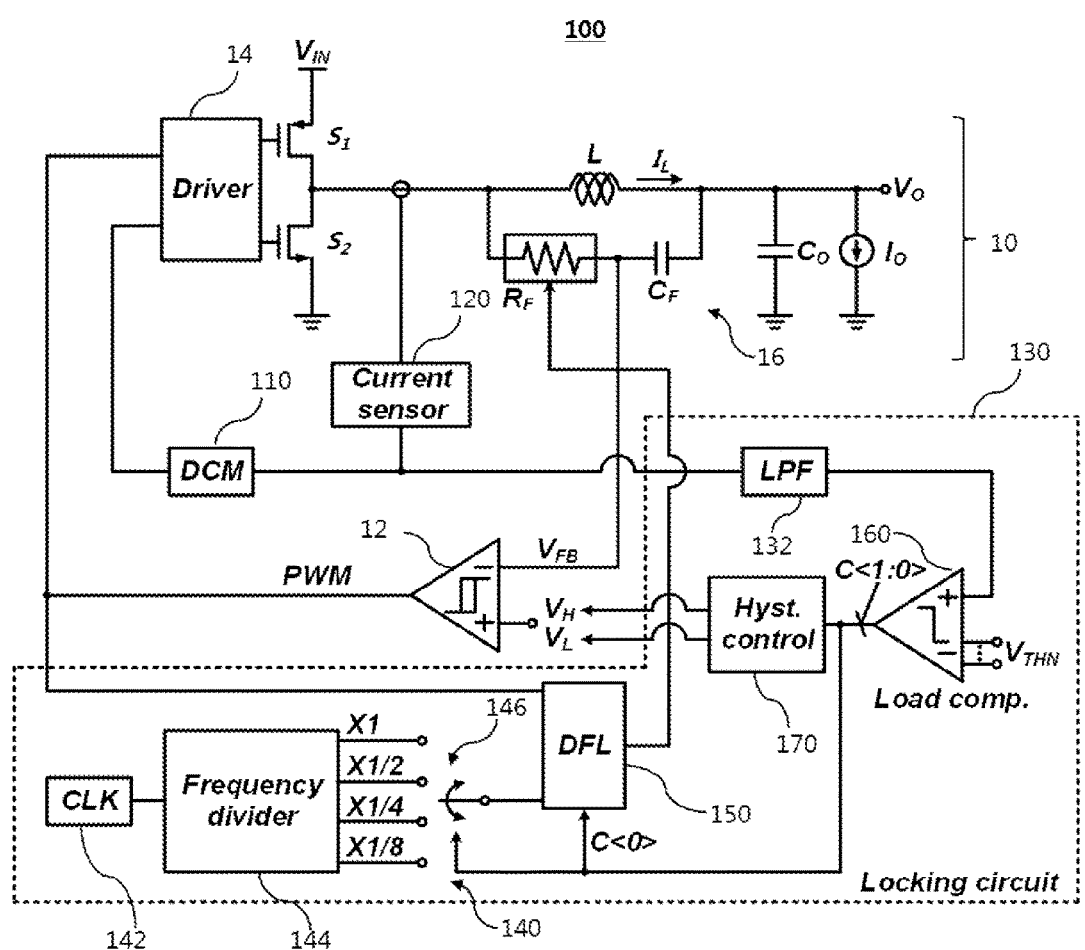
FIG. 3 illustrates an exemplary circuit configuration of the current mode hysteretic buck converter of FIG. 1 to which a frequency locking circuit is added according to an embodiment of the present invention.

According to an exemplary example of the present invention, as shown in FIG. 3 a frequency locking circuit 130 is added to the basic current mode hysteretic buck converter 10 shown in FIG. 1. With the added frequency locking circuit 130, the current mode hysteretic buck converter 100 may have an auto-selectable frequency locking function.

In the basic type buck converter 10 shown in FIG. 1, the switching frequency is changed, whereas the auto-selectable frequency locking type buck converter 100 shown in FIG. 3 is such that the switching frequency is locked to a predetermined value according to the load range.

With reference to FIG. 3, in an exemplary example the auto-selectable frequency locking type buck converter 100 may include a discontinuous conduction mode (DCM) circuit 110, a current sensor 120, and a frequency locking circuit 130 in addition to the basic buck converter 10 circuit shown in FIG. 1. However, in the case of the auto-selectable frequency locking type buck converter 100 shown in FIG. 3, the resistor R$_F$ of the RC network 16 of the basic buck converter 10 may be composed of a switched resistor, which is different from the basic type buck converter 10. The switched resistor may be composed of a series connection of switchable resistors each of which may include a resistor and a switch connected to the resistor in parallel. Individual resistors forming the switched resistor can be enabled or bypassed in the network based on a digital input signal that turns on or off the switches connected to each resistor so that the overall resistance value of the switched resistor can be adjusted.

In an exemplary example, the connection point of the two drain terminals of the first and second switch elements S$_1$ and S$_2$ may be connected to the input terminal of the gate driver 14 through the current sensor 120 and the DCM circuit 110. In addition, the connection point between the current sensor 120 and the DCM circuit 110 may be connected to the frequency locking circuit 130.

In an exemplary example, the frequency locking circuit 130 may include a variable clock signal providing unit 140, a digital frequency locking (DFL) unit 150, a load comparator 160, and a hysteresis control unit 170.

The variable clock signal providing unit 140 may include a clock signal generator (CLK) 142 for generating a clock signal having a constant frequency, and a frequency divider 142 dividing the frequency of the clock signal generated by the clock signal generator to a frequency of 1/N, where N is a natural number. In particular, the frequency divider 142 may be configured to be able to divide the frequency by various division ratios, for example, 1/1, 1/2, 1/4, 1/8, etc. The frequency divider 142 may have a separate output terminal for each frequency division ratio. The variable clock signal providing unit 140 may also include a switching unit 146 which is disposed between the plurality of output terminals of the frequency divider 142 and the digital frequency locking unit 150 and selects one of the plurality of output terminals of the frequency divider 142 based on an input frequency selection control signal so as to connect the selected output terminal to an input terminal of the DFL unit 150. With this configuration, the variable clock signal providing unit 140 can generate a plurality of kinds of clock signals having different frequencies, and provide a clock signal of a specific frequency designated by the frequency selection control signal among the generated clock signals to the DFL unit 150.

In an exemplary example, the frequency locking circuit 130 may further include a load comparator 160, a hysteresis control unit 170, and a low-pass filter (LPF) 132. A threshold voltage $V_{THN}$ may be applied to the negative input terminal of the load comparator 160, and the positive input terminal of the load comparator 160 may be connected to the connection point of the current sensor 120 and the DCM circuit 110 through the LPF 132. The output terminal of the load comparator 160 may be connected to the hysteresis control unit 170, the switching unit 146, and the DFL unit 150, respectively. The hysteresis control unit 170 may have output terminals for separately outputting the high level voltage $V_H$ and the low level voltage $V_L$, and these two output terminals $V_H$ and $V_L$ may be selectively connected to the positive input terminal of the hysteresis comparator 12.

The operation principle of the auto-selectable frequency locking type buck converter 100 having such a configuration will be described. As described above, the PWM signal is generated by the hysteresis comparator 12 and supplied to the gate driver 14 while the basic type buck converter 10 is operating. The frequency divider 142 generates a clock signal that is frequency-divided by a predetermined frequency division ratio using the clock signal provided by the clock signal generating unit 142. The switching unit 146 performs switching control so that a specific output terminal of the frequency divider 144 is connected to the DFL unit 150 based on the control signal. The DFL unit 150 receives the frequency of the PWM signal generated by the hysteresis comparator 12 and the reference frequency generated by the frequency divider 144, and compares the two frequencies to generate a digital code reflecting the difference between the two frequencies. The DFL unit 150 adjusts the value of the switched resistor $R_F$, that is, the slope of the ripple signal $V_{FB}$ based on the digital code to lock the switching frequency. Therefore, the frequency does not change in the load range where the inductor current $I_L$ operates in the CCM.

In the basic type current mode hysteretic buck converter 10 shown in FIG. 1, the load current applied to the parallel circuit of the inductor L and the RC network 16 through the first and second power switches $S_1$ and $S_2$ may be detected by the current sensor 120 and provided to the DCM circuit 110 and the load comparator 160. The DCM circuit 110 capable of detecting the zero current is additionally disposed between the gate driver 14 and the connection point between the current sensor 120 and the load comparator 160 of the frequency locking circuit 130. The DCM circuit 110 can prevent a reverse current from the load to the power switches $S_1$ and $S_2$ due to the low load current from flowing.

The DCM circuit 110 will be described in more detail. In the buck converter 10, the second switch $S_2$ may be configured using a power switch or a diode. A structure using the diode is called an asynchronous buck converter, and a structure using the power switch is called a synchronous buck converter.

In the structure using the diode, current flows through the diode when the first switch $S_1$ is off. At this time, a loss may occur due to the current flowing through the diode and the forward voltage applied to the diode. In a structure using the switch, the second switch $S_2$ is turned on when the first switch $S_1$ is off, and the current flows through the second switch $S_2$ as in the above-mentioned diode structure. At this time, a loss may occur due to the current flowing through the second switch $S_2$ and the internal resistance when the second switch $S_2$ is on. Generally, the switch may be used because the loss caused by the structure using a switch is smaller than the loss caused by the structure using the diode. In the diode, the current does not flow in the reverse direction. In the switch, however, the current may flow even if the current becomes 0 or less because the switch can allow the current to flow in the opposite direction. Therefore, the current that is required to flow only to the load side (the one with the capacitance) flows backwards, which can lead to unintended losses.

In order to prevent this, a case where a current flows in the opposite direction is detected in the structure using the switch, and the second switch $S_2$, which is in the on state, is turned off when a current flows in the opposite direction. This is called a diode emulation mode (zero current sensing (ZCS)) or the discontinuous conduction mode (DCM).

When the current mode hysteretic buck converter 10 is operated in the DCM, the switching frequency $f_{S\_DCM}$ may be obtained by the same method as that of obtaining the switching frequency when it is operated in the CCM. The switching frequency $f_{S\_DCM}$ may be calculated using the following equation.

$$f_{S\_DCM} = \frac{2I_O L(V_{IN} - V_O)V_O}{R_F^2 C_F^2 (V_H - V_L)^2 V_{IN}} \qquad (7)$$

The current mode hysteretic buck converter 10, in contrast to the CCM, changes abruptly in the switching frequency depending on the load current in the DCM. The frequency locking circuit 130 generates a digital control signal of a predetermined bit according to the load current section, that is, the magnitude of the load current, by the load comparator 160 in the range of the load current operating in the DCM or the boundary between the CCM and the DCM. This signal is provided as the frequency selection control signal of the switching unit 146 to enable a reference frequency generated in the frequency divider 144 to be changed to a desired frequency. FIG. 3 illustrates an exemplary case where the load comparator 160 generates a 2-bit control signal, C<1:0>, and the frequency divider 144 generates clock signals of four frequencies (i.e., clock signals obtained by dividing the frequency of the input clock signal by 1, ½, ¼, and ⅛ times).

However, the frequency (i.e., the reference frequency) of the output clock signal of the frequency divider 144 selected by the switching unit 146 and the frequency of the output PWM signal of the hysteresis comparator 12 are compared in the DFL unit 150. The DFL unit 150 generates results of the comparison as a digital code which is provided to the switched resistor $R_F$ for the control for tuning the resistance of the switched resistor $R_F$. When tuning the switched resistor $R_F$ based on the digital code generated by the DFL unit 150, a case where its resistance value may fail to reach the resistance for locking the frequency may occur. In order to solve such a problem, it is required that the resistance value range of the switched resistance $R_F$ should be wide. However, in order to widen the range of the resistance value, it is necessary to increase the number of the resistance values (bit of the digital code) of the switched resistance $R_F$ or increase the interval (1 bit step) between the resistance values of the switched resistance $R_F$. If the number of the resistance values of the switched resistor $R_F$ is increased, the number of bits of the digital code generated by the DFL unit 150 must also be increased. As a result, a circuit of the DFL unit 150 becomes more complicated and/or the speed at which the frequency is locked becomes slow. If the interval (1 bit step) between the resistance values is increased, the difference from the reference frequency becomes larger when the frequency is locked.

According to an exemplary example of the present invention, the frequency locking circuit 130 may further include a separate hysteresis control circuit 170. The hysteresis control circuit 170 may control the hysteresis based on the received 2-bit control signal generated by the load comparator 160 and make the resistance value range of the switched resistance $R_F$ necessary for locking the frequency the same according to a reference value. Thereby, the frequency can be locked without increasing the number of the resistance values (bit number). In addition, since it is not necessary to increase the interval (1 bit step) between the resistance values, it is possible to achieve a low error. Here, the hysteresis means $V_H$ and $V_L$ necessary for the operation of the buck converter 100 and one of the frequencies of CLK/1, CLK/2, CLK/4, and CLK8 provided by the frequency divider 144 and provided as the reference frequency of the DFL unit 150.

According to an exemplary embodiment, the load comparator 160 may simply include a plurality of comparators. The current sensor 120 acquires the current flowing through the inductor L (the current sensor 120 converts an acquired current into a voltage signal), and senses the magnitude of the load current by filtering the high frequency component of the current through the LPF 132. The load comparator 160 can determine the magnitude of the load current by comparing the load current to several threshold voltages $V_{THN}$ and generates a 2-bit signal corresponding to the range of the magnitude of the load current. This 2-bit signal is used to set the reference frequency signal needed to determine at what frequency in the DFL circuit 150 the switching frequency of the buck converter 100 is to be locked. That is, the 2-bit signal is used by the switching unit 146 to select one of the several clock signals CLK/1, CLK/2, CLK/4, and CLK/8 generated by the frequency divider 144 and to apply the selected one to the DFL circuit 150.

The buck converter 100 operates in the CCM in which the inductor current $I_L$ increases and decreases above zero when the load current $I_O$ is large. If the load current $I_O$ falls below a certain value, it may fall below zero if the inductor current $I_L$ decreases. However, if the buck converter 100 is equipped with the DCM circuit 110, the second switch $S_2$ can be turned off by the DCM circuit 110 so that the current does not flow when the inductor current $I_L$ falls below zero. Accordingly, there may be a period in which the waveform of the inductor current $I_L$ increases and decreases, and the current value becomes zero. The buck converter 100 with the DCM circuit 110 can operate in the DCM that repeats this operation.

The switching frequency of the current mode hysteretic buck converter 100 can be expressed as Equation (5) when operating in the CCM and Equation (7) when operating in the DCM. $V_H\text{-}V_L$ is the hysteresis voltage $V_{HYST}$. As can be seen from Equation (5), there is no change in the switching frequency when the operation is the CCM (the load current $I_O$ is large). The switching frequency may be changed by the delay of the internal circuits. Therefore, the range of the resistance value of the switched resistor $R_F$ that needs to be changed to lock the switching frequency is not large. On the other hand, in the DCM, when the load current $I_O$ is small, the switching frequency is changed by the load current $I_O$ as shown in Equation (7). Therefore, the range of the resistance value of the switched resistor $R_F$ necessary for locking the frequency is large. That is, the range of the resistance value of the switched resistor $R_F$ in the DCM is larger than that of the switched resistor $R_F$ in the CCM. Therefore, in order to cover the range of the resistance value of the switched resistor $R_F$ in the DCM within a predetermined bit, the interval (1 bit step) between the resistance values must be increased.

Therefore, in order to lock the frequency in the DCM with only the range of the resistance value of the switched resistor $R_F$ in the CCM, it is necessary to change other parameters besides changing only the resistance value. To this end, according to an exemplary embodiment of the present invention, a method of changing the hysteresis voltage $V_{HYST}$ ($=V_H\text{-}V_L$) in addition to the resistance value in the DCM may be applied. By varying the hysteresis voltage $V_{HYST}$ in accordance with the load current $I_O$, the range of the resistance value of the switched resistor $R_F$ necessary for locking the frequency can be adjusted to be constant. As a result, it is possible to improve the efficiency of the buck converter 100 at the light load by reducing the switching loss (V-I overlap) and the driving loss by lowering the switching frequency.

Figure 4:
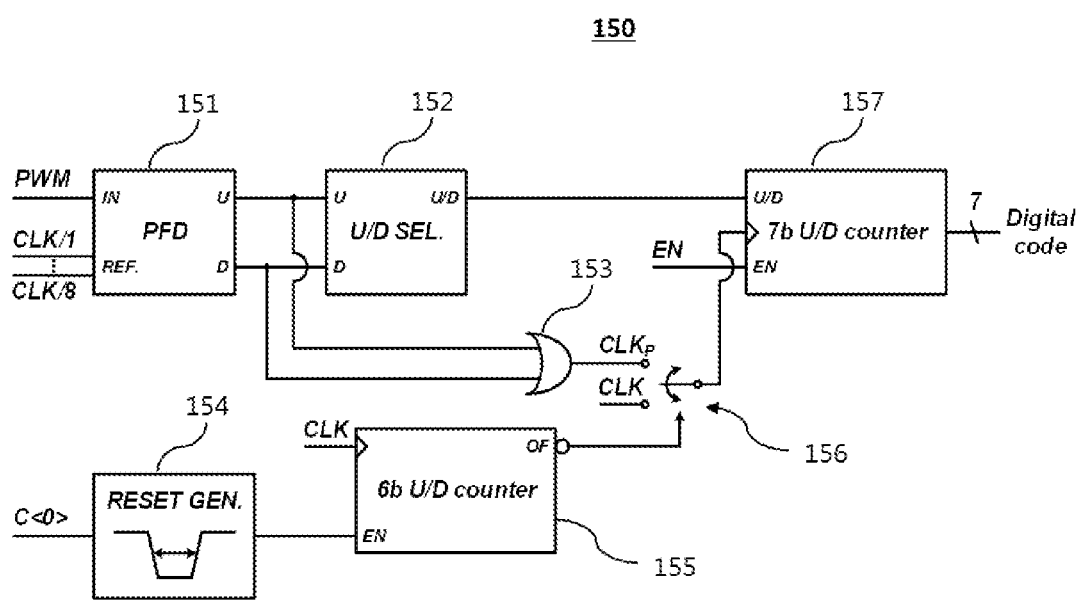
FIG. 4 illustrates a digital frequency locking circuit according to an embodiment of the present invention.
Figure 5:
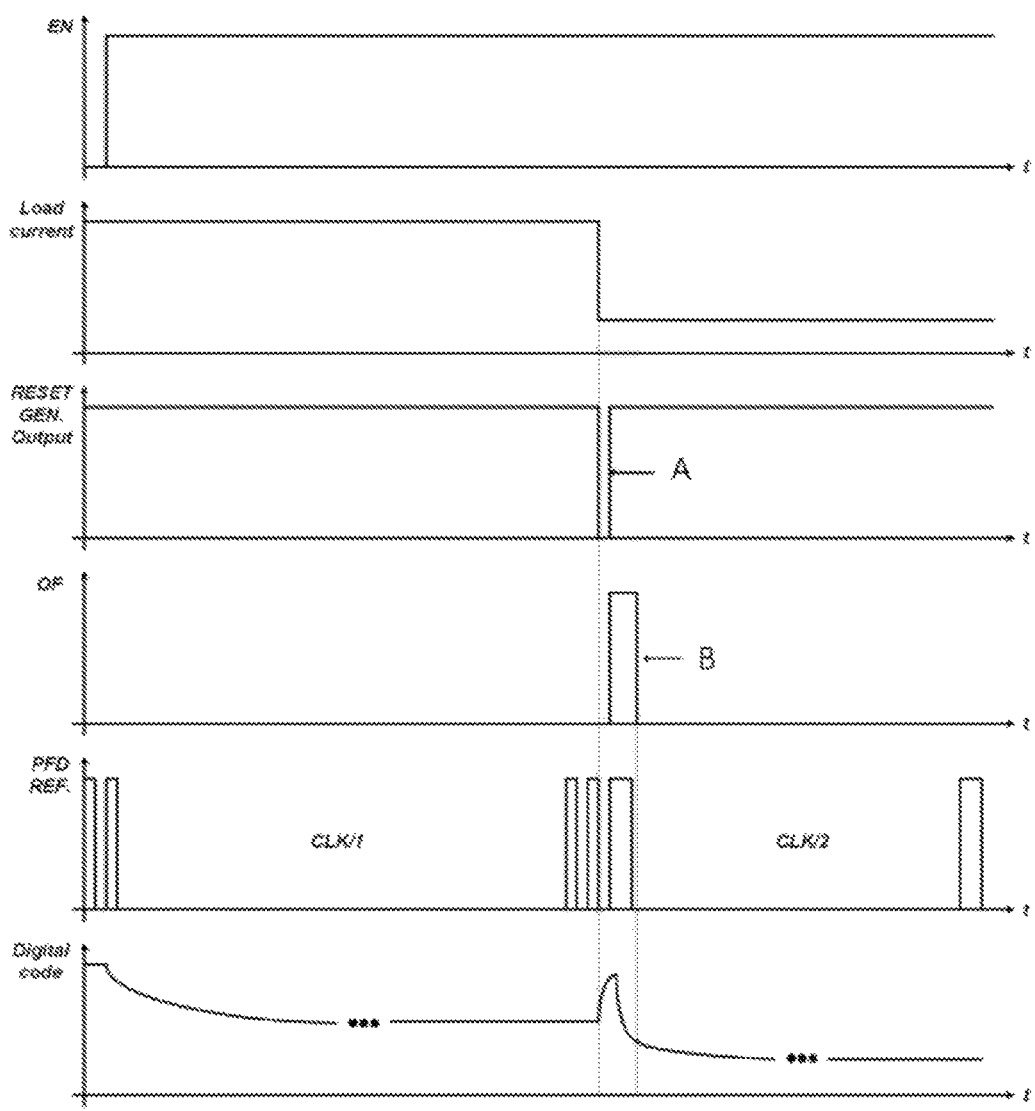
FIG. 5 illustrates an exemplary timing diagram of input and output signals of the respective elements of the circuit shown in FIG. 4.

FIG. 4 shows an exemplary circuit configuration of the DFL unit 150 according to an exemplary embodiment of the present invention. The waveform diagram shown in FIG. 5 shows an exemplary timing diagram of input/output signals of the respective elements of the circuit shown in FIG. 4. The configuration and operation of the DFL unit 150 will be described with reference to these two drawings.

The DFL unit 150 may include a phase frequency detector (PFD) 151, an up/down selector (U/D selector) 152, and a 7-bit up/down counter (7b U/D counter) 157. The DFL unit 150 may include an OR circuit 153, a switching unit 156, a reset generator 154, and a 6-bit up/down counter (6b U/D counter) 156.

The phase frequency detector 151 compares the frequency of the PWM signal provided from the hysteresis comparator 12 with the frequency of the reference signal from the frequency divider 144, and outputs an up-pulse or down-pulse. The up-pulse and the down-pulse are inputted to the U/D selector 152 and also to the OR circuit 153. The OR circuit 153 generates a signal $CLK_P$ by ORing the up-pulse and the down-pulse and provides the signal $CLK_P$ to the switching unit 156 to be used as the clock signal CLK of the 7-bit U/D counter 157.

The U/D selector 152 receives the up-pulse and the down-pulse from the phase frequency detector 151 and outputs an up/down (U/D) signal for determining whether the 7-bit U/D counter 157 should perform the up operation or the down operation. In addition, when the load is changed and the frequency comes to be locked through the above operation, the number of times that the up-pulse or down-pulse is generated from the phase frequency detector 151 is reduced. As a result, the number of pulses of the clock signal $CLK_P$ output from the OR circuit 153 is reduced, so that the speed of reaching the counter value necessary for frequency locking is gradually reduced. Therefore, instead of the clock signal $CLK_P$, the external clock signal CLK, which is the highest locked frequency among the frequencies used by the buck converter 100, is used as a clock signal for operating the 7-bit U/D counter 157 for generating the digital code. To this end, the least significant bit C<0> of the 2-bit control signal C>1:0> generated by the load comparator 160 through detecting the load range is used.

The case where the clock signal $CLK_P$ is selected by the switching unit 156 and the case where the external clock signal CLK is selected will be described in more detail. The external clock signal CLK is always equal to or greater than the clock signal $CLK_P$ in frequency. The clock signals CLK/1, CLK/2, CLK/4 and CLK/8 which are inputted as the reference frequency REF of the phase frequency detector 151 are the signals generated by dividing the external clock signal CLK in the frequency. The phase frequency detector 151 compares one of the clock signals CLK/1, CLK/2, CLK/4 and CLK/8 divided in the frequency divider 144 and the switching frequency of the PWM signal generated for switching control of the load in the current mode hysteretic buck converter 10, and produces a pulse signal corresponding to the frequency difference between the two signals. Therefore, as the frequency difference through the frequency comparison becomes larger, the frequency of the clock signal $CLK_P$ becomes higher, and as the frequency difference becomes smaller, the frequency of the clock signal $CLK_P$ becomes lower. However, the frequency of the clock signal $CLK_P$ is always smaller than the frequency of the external CLK signal.

The time to operate with the external clock signal CLK is set by the 6-bit U/D counter 155. Whenever the value of the least significant bit C<0> of the control signal generated by the load comparator 160 changes, that is, whenever the load current changes, the reset generator 154 generates a low signal, that is, a reset pulse of a certain time duration (See "A" in FIG. 5). The 6-bit U/D counter 155 may operates to increase the bit always. After the reset generator 154 generates the reset pulse, an overflow (OF) signal generated by the 6-bit U/D counter 155 during a period of 64/CLK becomes logic high and the external clock signal CLK is selected by the switching unit 156 and is applied to the CLK terminal of the 7-bit U/D counter 157. When the output of the 6-bit U/D counter 155 becomes '111111', the overflow (OF) signal generated by the 6-bit U/D counter 155 becomes low. At this time, in the phase frequency detector 151 a pulse corresponding to the frequency difference between the frequency of the PWM signal and the reference frequency REF of the reference clock signals CLK/1, CLK/2, CLK/4, and CLK/8 is selected and the selected pulse is applied to the CLK terminal of the 7-bit U/D counter 157 (see "B" in FIG. 5). The overflow (OF) signal may be provided to the switching unit 156 as a switching control signal. When the switching control signal is applied as a high signal, the external clock signal CLK is selected by the switching unit 156 and provided as the clock signal CLK of the 7-bit U/D counter 157.

Therefore, when the load range changes, for a time of 64/CLK the 7-bit U/D counter 157 operates with CLK signal and then operates with $CLK_P$. Through this, when the load range is changed, it is possible to quickly reach the counter value for locking the frequency first at a high frequency and then operate with the pulse generated by the phase frequency detector 151, so that it is possible to shorten the time required for reaching.

The present invention can be used in the manufacture of DC-DC converters.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. An auto-selectable frequency locking type buck converter comprising:
    a current mode hysteretic buck converter for converting an input DC voltage into a lower DC voltage; and
    a frequency locking unit for locking a switching frequency of the current mode hysteretic buck converter wherein the switching frequency is locked through adjusting a locking value of the switching frequency to be a predetermined value according to a size of a load,
    wherein the current mode hysteretic buck converter is configured such that a magnitude of an input voltage is changed by switching the load to which first and second switch elements are connected, and further comprises a discontinuous conduction mode (DCM) circuit for preventing a reverse current flow by turning off the second switch element in an ON state when a reverse current flows to the second switch element from the load due to a low load current.

2. The auto-selectable frequency locking type buck converter of claim 1, wherein the frequency locking unit divides the size of the load into a plurality of sections, and automatically adjust the switching frequency of the current mode hysteretic buck converter which is variable to be locked so that switching frequencies of different sizes are matched for each section of the size of the load.

3. The auto-selectable frequency locking type buck converter of claim 1, wherein the frequency locking unit adjusts a value of the switching frequency by adjusting a slope of a ripple signal obtained from the current mode hysteretic buck converter through comparing a real-time switching frequency of the current mode hysteretic buck converter with a reference frequency of a predetermined size.

4. The auto-selectable frequency locking type buck converter of claim 3, wherein the frequency locking unit adjust the slope of the ripple signal by adjusting a resistance value of a resistor-capacitor network, including a resistor and a capacitor connected, in parallel to an inductor.

5. The auto-selectable frequency locking type buck converter of claim 4, wherein the frequency locking unit automatically adjusts the resistance value of the resistor-capacitor network when there is any change in an input voltage and a load current by changing hysteresis $V_H$ and $V_L$ of a hysteretic comparator set in advance according to a condition of the load.

6. The auto-selectable frequency locking type buck converter of claim 4, wherein the resistor of the resistor-capacitor network include a switched resistor of which resistance value is able to be changed by a digital input signal.

7. The auto-selectable frequency locking type buck converter of claim 1, wherein the frequency locking unit comprises: a load comparator for generating a digital control signal of a predetermined bit according to a magnitude of a load current within a predetermined load current range; a variable clock signal provider capable of generating a plurality of types of clock signals having different frequencies and outputting a clock signal of a specific frequency among the clock signals based on the digital control signal output from the load comparator; and a digital frequency locking unit for tuning a resistance of a variable load resistor of the current mode hysteretic buck converter based on a result of comparison between the clock signal of the specific frequency provided by the variable clock signal provider and a PWM signal generated for switching control of the load by the current mode hysteretic buck converter.

8. The auto-selectable frequency locking type buck converter of claim 7, wherein the load comparator comprises: a load current sensor for sensing a magnitude of a load current applied to a parallel circuit of an inductor and a resistor-capacitor network through first and second switch elements of the current mode hysteretic buck converter; and a load comparator for comparing a magnitude of the load current with at least one threshold value and outputting a comparison result as the digital control signal.

9. The auto-selectable frequency locking type buck converter of claim 7, wherein the frequency locking unit further comprises a hysteresis control unit for maintaining a range of resistance value of a load resistor required for locking frequency according to a reference value by adjusting hysteresis of the digital control signal which is received from the load comparator.

10. The auto-selectable frequency locking type buck converter of claim 7, wherein the variable clock signal provider includes a clock signal generator for generating a clock signal of a predetermined frequency; a frequency divider for dividing a frequency of the clock signal generated by the clock signal generator into a plurality of types of clock signals having different frequencies; and a switching unit for selectively outputting any one of the plurality of types of clock signals generated by the frequency divider based on a frequency selection control signal.

11. The auto-selectable frequency locking type buck converter of claim 7, wherein the digital frequency locking unit comprises: a first up/down counter for up-counting or down-counting an incoming clock signal according to an up/down signal; a phase frequency detector for comparing a frequency of a PWM signal provided by a hysteresis comparator with a frequency of a reference signal provided by a frequency divider to generate an up-pulse or a down-pulse according to difference therebetween; an up/down selector for receiving the up-pulse and the down-pulse from the phase frequency detector and generating the up/down signal for determining an up/down operation of the first up/down counter; an OR circuit for outputting a clock signal $CLK_P$ obtained by performing an OR operation on the up-pulse and the down-pulse outputted from the phase frequency detector; a switching unit for selectively outputting either one of the clock signal $CLK_P$ from the OR circuit and an externally provided clock signal CLK based on a switching control signal; a second up/down counter for outputting a switching control signal to the switching unit such that the switching unit selects and outputs the externally provided clock signal CLK instead of the clock signal $CLK_P$ when a cumulative count value of an incoming clock signal reaches a predetermined value; and a reset generator for generating a low signal that lasts for a predetermined time to reset the second up/down counter whenever a value of the least significant bit of a control signal generated by the load comparator is changed.

12. The auto-selectable frequency locking type buck converter of claim 1, wherein the frequency locking unit comprises: a load comparator for generating a digital control signal of a predetermined bit according to a magnitude of a load current within a predetermined load current range; a variable clock signal provider capable of generating a plurality of types of clock signals having different frequencies and outputting a clock signal of a specific frequency among the clock signals based on the digital control signal output from the load comparator; and a digital frequency locking unit for tuning a resistance of a variable load resistor of the current mode hysteretic buck converter based on a result of comparison between the clock signal of the specific frequency provided by the variable clock signal provider and a PWM signal generated for switching control of the load by the current mode hysteretic buck converter.

13. The auto-selectable frequency locking type buck converter of claim 1, wherein the current mode hysteretic buck converter comprises: a load circuit including an inductor and an RC network, including a resistor and a capacitor, being coupled in parallel to the inductor, for generating a ripple signal; a switching unit, including first and second switch elements connected to the load circuit, for switching such that a magnitude of a voltage applied to the load circuit is varied by switching a magnitude of an input voltage and adjusting a frequency of the ripple signal; a hysteresis comparator for receiving the ripple signal, comparing the ripple signal with an upper threshold value and a lower threshold value of a hysteresis voltage, and outputting a PWM signal according to a comparison result; and a gate driver for receiving the PWM signal and controlling on/off of the first and second switch elements of the switching unit, and wherein the resistor is a switched resistor of which resistance value can be changed by a digital input signal provided by the frequency locking unit.

14. An auto-selectable frequency locking type buck converter comprising:
a current mode hysteretic buck converter for converting an input DC voltage into a lower DC voltage by switching a load to which first and second switch elements are connected;
a frequency locking unit for locking a switching frequency of the current mode hysteretic buck converter wherein the switching frequency is locked through adjusting a locking value of the switching frequency to be a predetermined value according to a size of a load; and
a discontinuous conduction mode (DCM) circuit for preventing a reverse current flow by turning off the second switch element in an ON state when a reverse current flows to the second switch element from the load due to a low load current,
wherein the frequency locking unit divides the size of the load into a plurality of sections, and automatically adjusts the switching frequency of the current mode hysteretic buck converter which is variable to be locked so that switching frequencies of different sizes are matched for each section of the size of the load.

15. The auto-selectable frequency locking type buck converter of claim 14, wherein the frequency locking unit adjusts a value of the switching frequency by adjusting a slope of a ripple signal obtained from the current mode hysteretic buck converter through comparing a real-time switching frequency of the current mode hysteretic buck converter with a reference frequency of a predetermined size.

16. The auto-selectable frequency locking type buck converter of claim 15, wherein the frequency locking unit adjusts the slope of the ripple signal by adjusting a resistance value of a resistor-capacitor network, including a resistor and a capacitor connected, in parallel to an inductor.

17. The auto-selectable frequency locking type buck converter of claim 16, wherein the frequency locking unit automatically adjusts the resistance value of the resistor-capacitor network when there is any change in an input voltage and a load current by changing hysteresis $V_H$ and $V_L$ of a hysteretic comparator set in advance according to a condition of the load.

18. The auto-selectable frequency locking type buck converter of claim 14, wherein the frequency locking unit comprises: a load comparator for generating a digital control signal of a predetermined bit according to a magnitude of a load current within a predetermined load current range; a variable clock signal provider capable of generating a plurality of types of clock signals having different frequencies and outputting a clock signal of a specific frequency among the clock signals based on the digital control signal output from the load comparator; a digital frequency locking unit for tuning a resistance of a variable load resistor of the current mode hysteretic buck converter based on a result of comparison between the clock signal of the specific frequency provided by the variable clock signal provider and a PWM signal generated for switching control of the load by the current mode hysteretic buck converter; and a hysteresis control unit for maintaining a range of resistance value of a load resistor required for locking frequency according to a reference value by adjusting hysteresis of the digital control signal which is received from the load comparator.

19. The auto-selectable frequency locking type buck converter of claim 18, wherein the digital frequency locking unit comprises: a first up/down counter for up-counting or down-counting an incoming clock signal according to an up/down signal; a phase frequency detector for comparing a frequency of a PWM signal provided by a hysteresis comparator with a frequency of a reference signal provided by a frequency divider to generate an up-pulse or a down-pulse according to difference therebetween; an up/down selector for receiving the up-pulse and the down-pulse from the phase frequency detector and generating the up/down signal for determining an up/down operation of the first up/down counter; an OR circuit for outputting a clock signal $CLK_P$ obtained by performing an OR operation on the up-pulse and the down-pulse outputted from the phase frequency detector; a switching unit for selectively outputting either one of the clock signal $CLK_P$ from the OR circuit and an externally provided clock signal CLK based on a switching control signal; a second up/down counter for outputting a switching control signal to the switching unit such that the switching unit selects and outputs the externally provided clock signal CLK instead of the clock signal $CLK_P$ when a cumulative count value of an incoming clock signal reaches a predetermined value; and a reset generator for generating a low signal that lasts for a predetermined time to reset the second up/down counter whenever a value of the least significant bit of a control signal generated by the load comparator is changed.

* * * * *